United States Patent
Kim

(10) Patent No.: US 11,155,297 B2
(45) Date of Patent: Oct. 26, 2021

(54) MOTOR DRIVEN POWER STEERING SYSTEM AND CONTROL METHOD THEREOF

(71) Applicant: HYUNDAI MOBIS CO., LTD., Seoul (KR)

(72) Inventor: Tae Hong Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 223 days.

(21) Appl. No.: 16/170,916

(22) Filed: Oct. 25, 2018

(65) Prior Publication Data
US 2019/0126978 A1  May 2, 2019

(30) Foreign Application Priority Data
Oct. 27, 2017 (KR) .................. 10-2017-0141461

(51) Int. Cl.
*B62D 5/04* (2006.01)
*B62D 6/10* (2006.01)
*B62D 6/00* (2006.01)

(52) U.S. Cl.
CPC ............ *B62D 6/10* (2013.01); *B62D 5/0463* (2013.01); *B62D 6/008* (2013.01)

(58) Field of Classification Search
CPC ......... B62D 6/10; B62D 6/008; B62D 5/0463
See application file for complete search history.

(56) References Cited

U.S. PATENT DOCUMENTS

| 6,072,293 A * | 6/2000 | Shimizu ............... B62D 5/0463 318/432 |
| 2006/0090952 A1* | 5/2006 | Ito ...................... B62D 15/0235 180/446 |
| 2010/0211270 A1* | 8/2010 | Chin ..................... B62D 6/007 701/44 |

(Continued)

FOREIGN PATENT DOCUMENTS

| JP | 2004-338562 A | 12/2004 |
| JP | 2008149961 A * | 7/2008 |

(Continued)

OTHER PUBLICATIONS

Naranjo et al., "Power-steering Control Architecture for Automatic Driving," in IEEE Transactions on Intelligent Transportation Systems 6, No. 4 (Dec. 2005), 406-415. (Year: 2005).*

(Continued)

*Primary Examiner* — Donald J Wallace
*Assistant Examiner* — Daniel M. Robert
(74) *Attorney, Agent, or Firm* — NSIP Law

(57) ABSTRACT

An MDPS (Motor Driven Power Steering) system may include: a vehicle speed sensor configured to sense vehicle speed; a yaw rate sensor configured to sense a tilted state of the vehicle, and output a yaw rate value; a lateral acceleration sensor configured to sense lateral acceleration which acts in a lateral direction of the vehicle; and an MDPS controller configured to receive the vehicle speed, the yaw rate value and the lateral acceleration from the vehicle speed sensor, the yaw rate sensor and the lateral acceleration sensor, respectively, and calculate assist torque by estimating column torque.

7 Claims, 3 Drawing Sheets

(56) References Cited

U.S. PATENT DOCUMENTS

| | | | | |
|---|---|---|---|---|
| 2012/0259513 | A1* | 10/2012 | Strecker | B62D 5/0466 701/41 |
| 2014/0230533 | A1* | 8/2014 | Greul | B62D 6/008 73/117.02 |
| 2018/0050724 | A1* | 2/2018 | Morselli | B62D 1/12 |
| 2019/0031231 | A1* | 1/2019 | George | B62D 5/0463 |

FOREIGN PATENT DOCUMENTS

| | | | |
|---|---|---|---|
| JP | 2015076645 A | * | 4/2015 |
| KR | 10-2008-0078428 A | | 8/2008 |

OTHER PUBLICATIONS

Tomorrow's Technician Staff, "Steering Angle Sensor Calibration," published Apr. 5, 2016, in https://www.tomorrowstechnician.com/steering-angle-sensor-calibration/#:~:text=The (accessed Aug. 4, 2020). (Year: 2016).*

Vladimir Chevatco, Exploration of Steering Feel, Degree Project in Vehicle Engineering, First Level (Stockholm, Sweden, 2015), 1-22. (Year: 2015).*

Bevly et al., "Integrating INS Sensors With GPS Measurements for Continuous Estimation of Vehicle Sideslip, Roll, and Tire Cornering Stiffness," IEEE Transactions on Intelligent Transportation Systems 7 (2006): 483-493 (Year: 2006).*

Yoon et al. (J. Yoon and H. Peng, "A Cost-Effective Sideslip Estimation Method Using Velocity Measurements From Two GPS Receivers," in IEEE Transactions on Vehicular Technology, vol. 63, No. 6, pp. 2589-2599, Jul. 2014, https://ieeexplore.ieee.org/document/6680690). (Year: 2014).*

Nam, Kanghyun. 2015. "Application of Novel Lateral Tire Force Sensors to Vehicle Parameter Estimation of Electric Vehicles" Sensors 15, No. 11: 28385-28401. https://doi.org/10.3390/s151128385). (Year: 2015).*

Minje, Hyun; Cho Wanki. "Estimation of Road Bank Angle and Vehicle Side Slip Angle Using Bayesian Tracking and Kalman Filter Approach," International Journal of Automotive Technology; Dordrecht vol. 19, Iss. 6, (Dec. 2018): 993-1000. DOI:10.1007/s12239-018-0096-y (Year: 2018).*

Korean Office Action dated Jul. 30, 2021 in counterpart Korean Patent Application No. 10-2017-0141461 (3 pages in Korean).

* cited by examiner

MOTOR DRIVEN POWER STEERING SYSTEM AND CONTROL METHOD THEREOF

CROSS-REFERENCES TO RELATED APPLICATIONS

The present application claims priority to Korean application number 10-2017-0141461, filed on Oct. 27, 2017, which is incorporated by reference in its entirety.

BACKGROUND OF THE INVENTION

The present invention relates to an MDPS (Motor Driven Power Steering) system and a control method thereof, and more particularly, to an MDPS system and a control method thereof, which can generate assist torque required for a driver even though a torque sensor broke down in the MDPS system, thereby maximizing the stability and reliability.

In general, an MDPS system represents a steering system that provides assist torque in a driver's steering direction, using an electric motor, and thus enables the driver to easily handle a steering wheel.

Unlike an existing hydraulic power steering (HPS) system, the MDPS system can automatically control the operation of the electric motor according to a driving condition of a vehicle, and thus improve steering performance and steering feel.

The MDPS system includes a torque sensor for measuring steering torque of a driver, inputted to the steering wheel, a steering angle sensor for determining a steering angle of the steering wheel, and a vehicle speed sensor for measuring a vehicle speed, in order to determine the driving condition of the vehicle.

When the torque sensor breaks down while the vehicle having the MDPS system mounted therein travels, the MDPS system may provide an inappropriate assist force which is likely to disturb the driver's steering. Therefore, the MDPS system is switched to the manual mode.

However, when the MDPS system is suddenly switched to the manual mode, the driver may feel a strong sense of difference during steering.

For example, when the MDPS system is suddenly switched to the manual mode while cornering at low speed, the driving stability of the vehicle may be degraded while the driver suddenly feels a heavy sense of difference. In this case, an accident may occur.

The related art of the present invention is disclosed in Korean Patent Publication No. 2008-0078428 published on Aug. 27, 2008 and entitled "Method for correcting zero point of torque sensor".

Such an MDPS system must use a driver's torque amount sensed by the torque sensor, in order to steer the vehicle according to the driver's steering intention. Therefore, when the torque sensor broke down, the MDPS system may be switched to the manual mode. In this case, the MDPS system cannot perform steering.

SUMMARY OF THE INVENTION

Embodiments of the present invention are directed to an MDPS system and a control method thereof, which can generate assist torque required for a driver by estimating virtual column torque based on a yaw rate value, lateral acceleration and vehicle speed, even though a torque sensor broke down in the MDPS system, thereby maximizing the stability and reliability.

In one embodiment, an MDPS system may include: a vehicle speed sensor configured to sense vehicle speed; a yaw rate sensor configured to sense a tilted state of the vehicle, and output a yaw rate value; a lateral acceleration sensor configured to sense lateral acceleration which acts in a lateral direction of the vehicle; and an MDPS controller configured to receive the vehicle speed, the yaw rate value and the lateral acceleration from the vehicle speed sensor, the yaw rate sensor and the lateral acceleration sensor, respectively, and calculate assist torque by estimating column torque.

The MDPS controller may include: a column torque estimation unit configured to estimate a behavior value based on a dynamic model of the vehicle, calculate a rack force by calculating a tire lateral force based on the behavior value, and estimate the column torque through the rack force; and an assist torque calculation unit configured to calculate the assist torque based on the vehicle speed, a steering angle and the column torque estimated by the column torque estimation unit.

The column torque estimation unit may include: a behavior estimation unit configured to receive the vehicle speed, the yaw rate value and the lateral acceleration, and estimate the behavior value based on the dynamic model of the vehicle; a tire lateral force calculation unit configured to calculate front and rear tire lateral forces based on the behavior value estimated by the behavior estimation unit; a rack force calculation unit configured to calculate the rack force by multiplying the front and rear tire lateral forces calculated through the tire lateral force calculation unit by a cornering stiffness correction gain; and a column torque calculation unit configured to calculate the column torque by inversely transforming the rack force calculated through the rack force calculation unit.

The behavior estimation unit may estimate the behavior value through an external Kalman filter based on the dynamic model of the vehicle.

The behavior value may include one or more of a side slip of the vehicle, a steering angle and an estimated yaw rate value.

The MDPS controller may include: a PID control unit configured to receive a steering angle and a motor angle from a steering angle sensor and a motor angle sensor, respectively, and calculate a motor position control value such that the motor angle follows the steering angle; and an output selection unit configured to selectively output the motor position control value calculated through the PID control unit and the assist torque calculated through the assist torque calculation unit, depending on the vehicle speed.

The MDPS controller may further include a synchronization unit configured to synchronize the steering angle of the steering angle sensor and the motor angle of the motor angle sensor, when the vehicle is started.

The output selection unit may output the motor position control value as the final assist torque when the vehicle speed is less than a preset speed, and output the assist torque as the final assist torque when the vehicle speed is equal to or more than the preset speed.

In another embodiment, a control method of an MDPS system may include: receiving, by an MDPS controller, a vehicle speed, yaw rate value and lateral acceleration and estimating a behavior value based on a dynamic model of a vehicle, when the vehicle speed is equal to or more than a preset vehicle speed; calculating, by the MDPS controller, front and rear tire lateral forces based on the estimated behavior value; calculating, by the MDPS controller, a rack force by multiplying the front and rear tire lateral forces by a cornering stiffness correction gain; calculating, by the MDPS controller, column torque by inversely transforming the rack force; and calculating, by the MDPS controller, assist torque based on the calculated column torque, the vehicle speed and a steering angle.

In the estimating of the behavior value, the MDPS controller may estimate the behavior value through an external Kalman filter based on the dynamic model of the vehicle.

The behavior value may include one or more of a side slip of the vehicle, a steering angle and an estimated yaw rate value.

The control method may further include receiving, by the MDPS controller, a steering angle and motor angle when the vehicle speed is less than the preset vehicle speed, and calculating a motor position control value through PID control such that the motor angle follows the steering angle.

The control method may further include synchronizing, by the MDPS controller, the steering angle of a steering angle sensor and a motor angle of a motor angle sensor, when the vehicle is started.

DESCRIPTION OF SPECIFIC EMBODIMENTS

Hereafter, an MDPS system and a control method thereof in accordance with embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
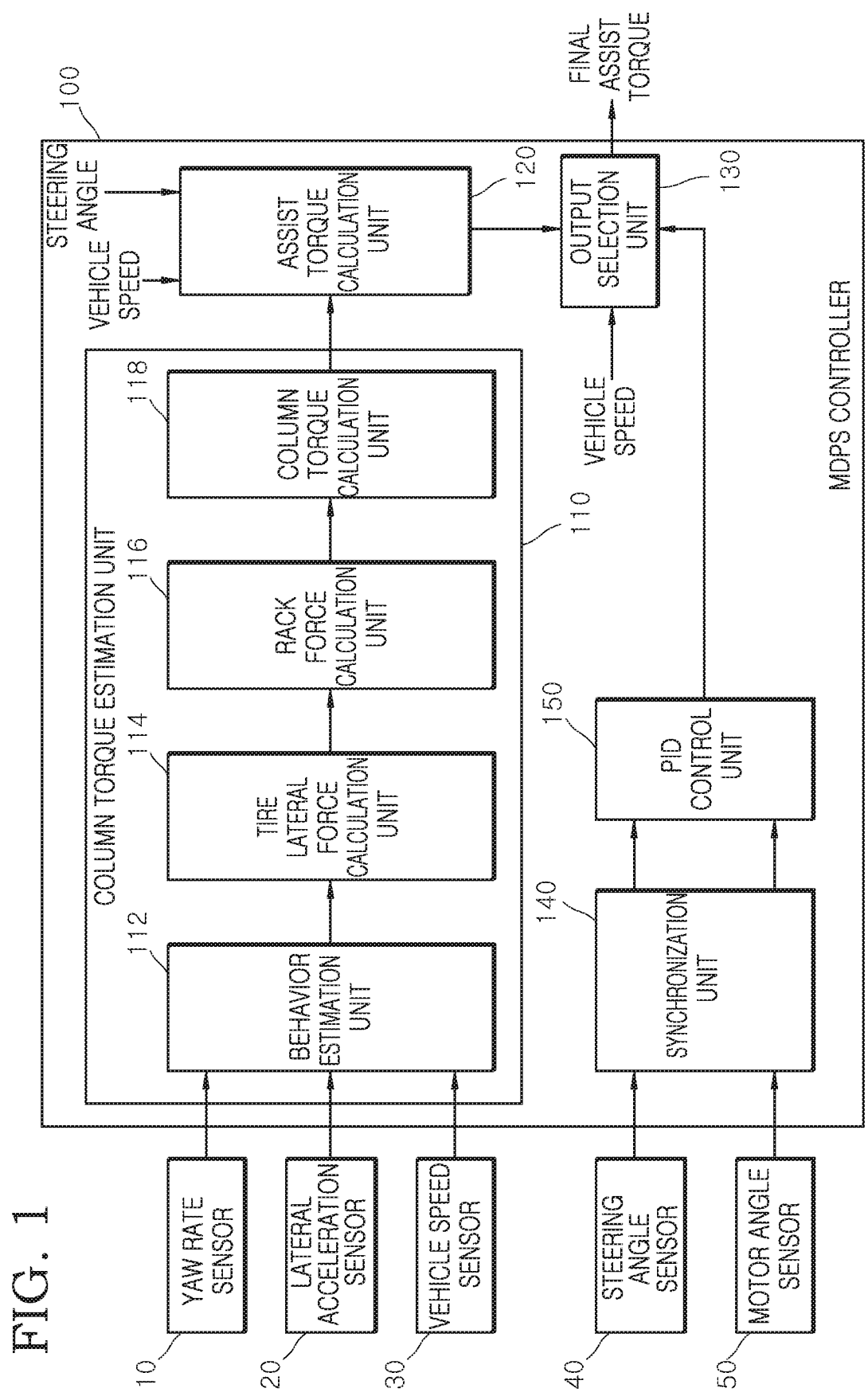
FIG. 1 is a block diagram illustrating an MDPS system in accordance with an embodiment of the present invention.
Figure 2:
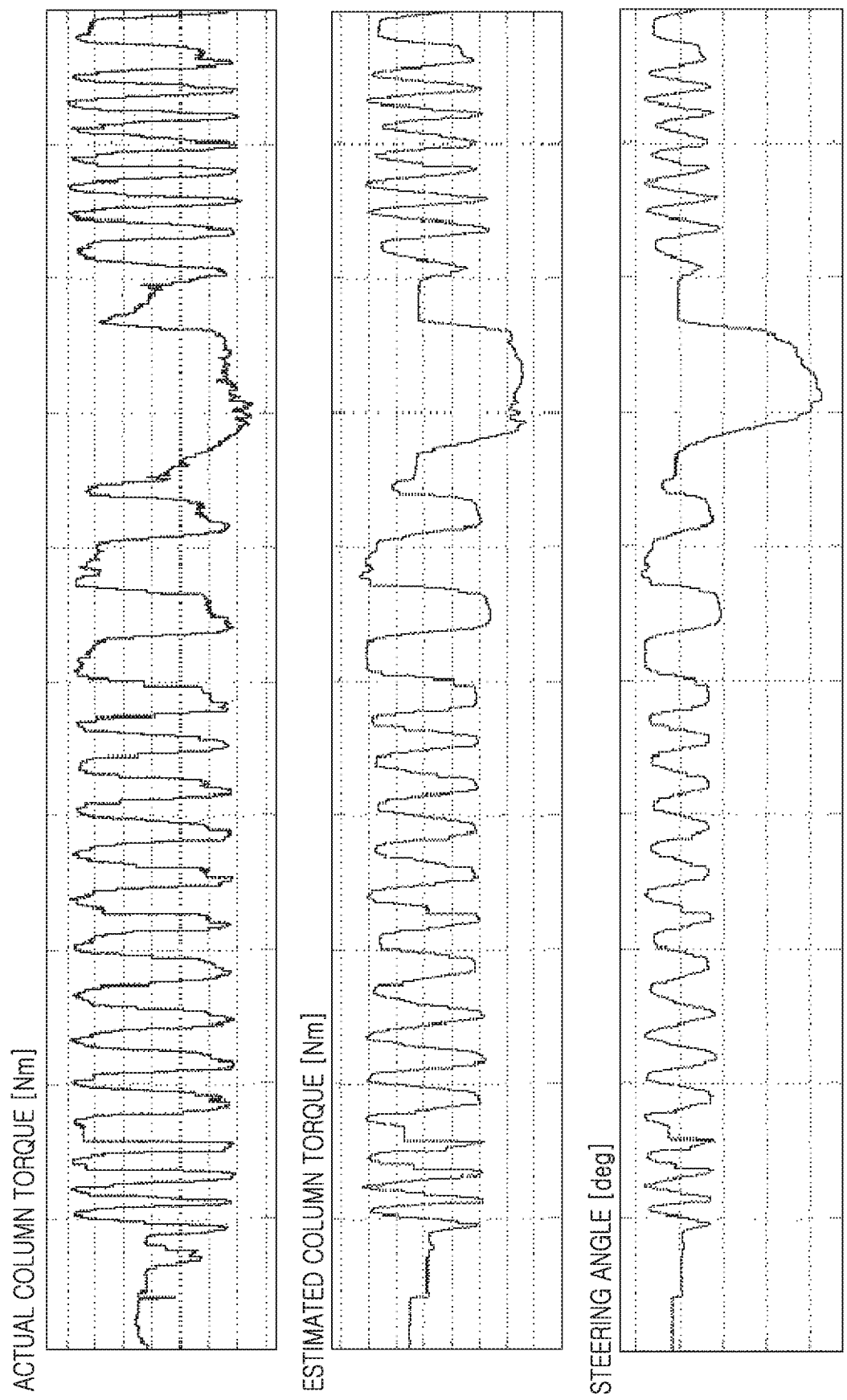
FIG. 2 is a graph illustrating simulation results of a steering angle and column torque by the MDPS system in accordance with the embodiment of the present invention.

FIG. 1 is a block diagram illustrating an MDPS system in accordance with an embodiment of the present invention, and FIG. 2 is a graph illustrating simulation results of a steering angle and column torque by the MDPS system in accordance with the embodiment of the present invention.

As illustrated in FIG. 1, the MDPS system may include a yaw rate sensor 10, a lateral acceleration sensor 20, a vehicle speed sensor 30 and an MDPS controller 100.

The yaw rate sensor 10 may sense a tilted state of a vehicle, and output a yaw rate value to the MDPS controller 100.

The lateral acceleration sensor 20 may sense lateral acceleration which acts in the lateral direction of the vehicle, and output the sensed lateral acceleration to the MDPS controller 100.

The vehicle speed sensor 30 may sense the speed of the vehicle, and output the sensed speed to the MDPS controller 100.

The MDPS controller 100 may receive the yaw rate value, the lateral acceleration and the vehicle speed from the yaw rate sensor 10, the lateral acceleration sensor 20 and the vehicle speed sensor 30, and calculate assist torque by estimating column torque.

The column torque may refer to torque which is applied to a steering shaft (not illustrated), when a driver operates a steering wheel (not illustrated) to make a left/right turn or to change a lane. Therefore, a torque sensor (not illustrated) may sense the column torque to determine the driver's steering intention. However, when the torque sensor broke down or is not installed in the vehicle, the MDPS controller 100 may calculate the assist torque by estimating the column torque through a dynamic model of the vehicle based on the vehicle speed, the yaw rate value and the lateral acceleration.

Therefore, the MDPS controller 100 may include a column torque estimation unit 110 and an assist torque calculation unit 120.

The column torque estimation unit 110 may estimate a behavior value based on the dynamic model of the vehicle, calculate a rack force by calculating a tire lateral force based on the behavior value, and estimate column torque through the rack force.

The column torque estimation unit 110 may include a behavior estimation unit 112, a tire lateral force calculation unit 114, a rack force calculation unit 116 and a column torque calculation unit 118.

The behavior estimation unit 112 may receive the vehicle speed, the yaw rate value and the lateral acceleration, and estimate a behavior value based on the dynamic model of the vehicle.

At this time, the behavior value may include one or more of a side slip, steering angle and estimated yaw rate value.

When the behavior estimation unit 112 receives the vehicle speed, the yaw rate value and the lateral acceleration and estimates a side slip and steering angle of the vehicle based on the dynamic model of the vehicle, an extended Kalman filter may be used to prevent a sense of difference or vibration which is caused by noise generated from the yaw rate sensor 10 or the lateral acceleration sensor 20.

When the vehicle travels at low speed, the signal of the yaw rate sensor 10 or the lateral acceleration sensor 20 may not be generated or destabilized. Therefore, the behavior estimation unit 112 may estimate more stable column torque using the yaw rate value estimated through the extended Kalman filter.

The tire lateral force calculation unit 114 may calculate front and rear tire lateral forces based on the behavior value estimated by the behavior estimation unit 112.

The rack force calculation unit 116 may calculate a rack force by multiplying the front and rear tire lateral forces calculated through the tire lateral force calculation unit 114 by a cornering stiffness correction gain.

The front and rear tire lateral forces calculated by the tire lateral force calculation unit 114 may be very similar to the pattern of assist torque required when the driver steers the vehicle. However, since a change of the yaw rate value depending on the vehicle behavior does not completely coincide with an actual column torque change of the driver, the rack force calculation unit 116 may calculate the rack force by multiplying the cornering stiffness correction gain by the front and rear tire lateral forces, in order to match the yaw rate value with the column torque pattern required for the driver depending on the vehicle behavior.

FIG. 2 shows that the simulation result coincides with the actual steering pattern of the driver when the estimated column torque, the actual column torque and the steering angle are compared.

The column torque calculation unit 118 may calculate column torque by inversely transforming the rack force calculated through the rack force calculation unit 116.

The assist torque calculation unit 120 may calculate assist torque based on the vehicle speed, the steering angle and the column torque estimated by the column torque estimation unit 110.

The MDPS controller 100 may further include a PID control unit 150 which receives a steering angle and a motor angle from a steering angle sensor 40 and a motor angle sensor 50, and calculates a motor position control value such that the motor angle follows the steering angle.

When the values of the yaw rate sensor 10 and the lateral acceleration sensor 20 converge to zero while the vehicle speed is less than a preset speed or the vehicle is stopped, only a column steering wheel may be twisted from a torsion bar at the top of a pinion in the case where the driver steers the vehicle with no assist torque provided. In this case, the motor angle of a driving motor (not illustrated) positioned at the bottom of the pinion may be changed.

When the steering angle of the steering angle sensor 40 and the motor angle of the motor angle sensor 50 differ from each other, the PID control unit 150 may calculate the motor position control value such that the motor angle follows the steering angle. Then, the PID control unit 150 may control the motor position in the direction that the driver steers the vehicle. As a result, the assist torque required for the driver may be generated.

For this operation, the MDPS controller 100 may further include a synchronization unit 140 for synchronizing the steering angle of the steering angle sensor 40 and the motor angle of the motor angle sensor 50 with each other, when the vehicle is started.

Since the steering angle sensor 40 is an absolute angle sensor, the steering angle sensor 40 can output a steering angle depending on the position of the steering wheel, when the vehicle is started. However, since the motor angle sensor 50 cannot know the absolute position, the motor angle sensor 50 may recognize and store the absolute angle of the steering angle sensor 40 during the start of the vehicle as the current position of the motor angle sensor 50, and then synchronize the steering angle and the motor angle in consideration of a gear ratio. Therefore, the motor angle sensor 50 may provide the motor angle by updating a changed position through an encoder based on the synchronized current position.

The MDPS controller 100 may further include an output selection unit 130 which selectively outputs the motor position control value calculated by the PID control unit 150 and the assist torque calculated by the assist torque calculation unit 120, depending on the vehicle speed.

When the vehicle speed is less than a preset speed, the output selection unit 130 may output the motor position control value calculated by the PID control unit 150 as the final assist torque, because the yaw rate sensor 10 or the lateral acceleration sensor 20 outputs no signal. When the vehicle speed is equal to or more than the preset speed, the output selection unit 130 may output assist torque as the final assist torque, the assist torque being calculated based on the column torque calculated by the column torque estimation unit 110.

At this time, the preset vehicle speed may be set according to by which speed the yaw rate value is stably estimated through the extended Kalman filter. In the present embodiment, the preset vehicle speed may be set to 20 kph, but changed to various values.

As described above, the MDPS system in accordance with the embodiment of the present invention can generate assist torque required for a driver by estimating virtual column torque based on the yaw rate, the lateral acceleration and the vehicle speed, even though the torque sensor breaks down, thereby maximizing stability and reliability. Furthermore, the MDPS system can generate the assist torque by estimating the column torque without a torque sensor, which makes it possible to reduce the number of parts and the manufacturing cost.

Figure 3:
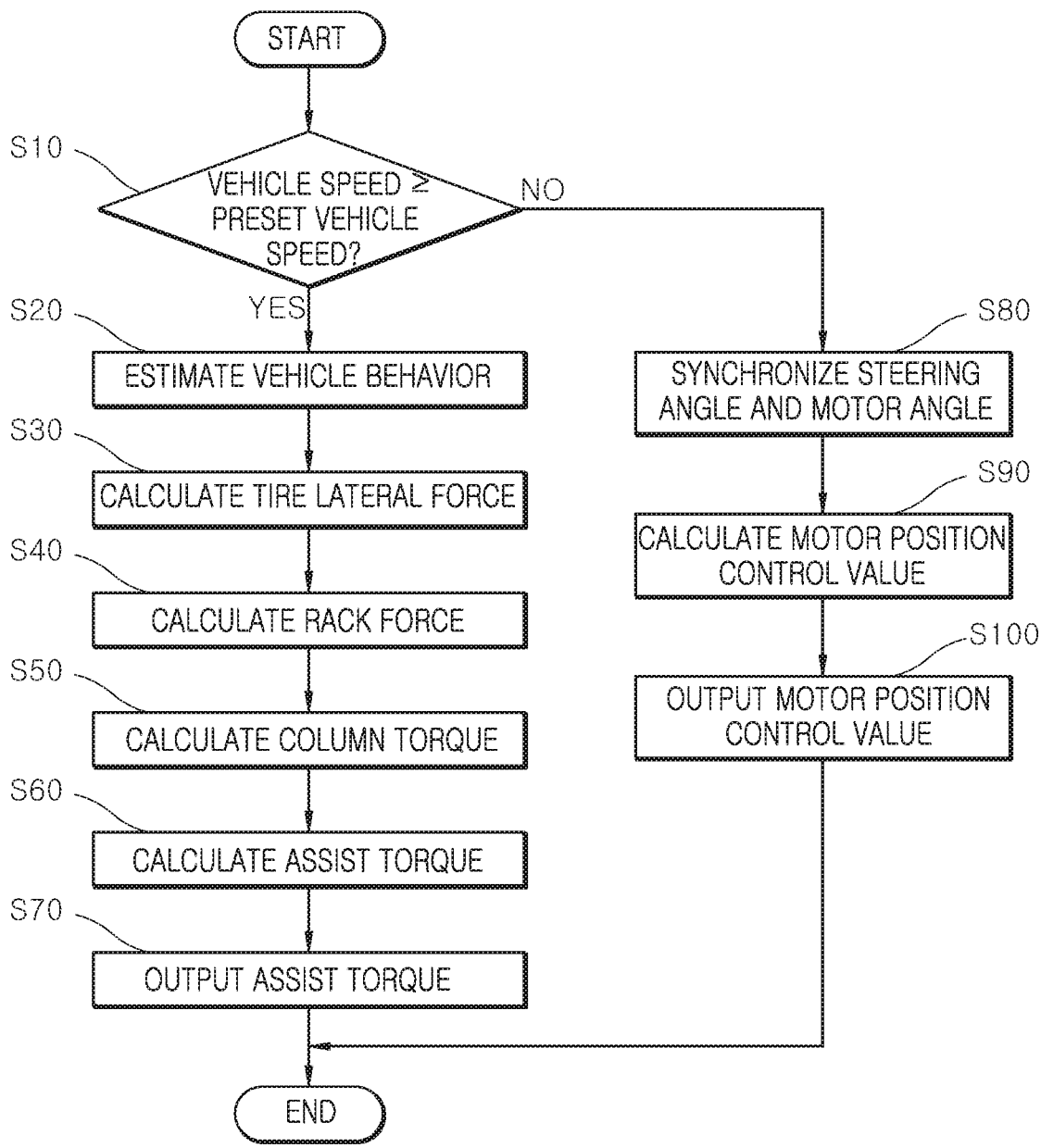
FIG. 3 is a flowchart illustrating a control method of an MDPS system in accordance with an embodiment of the present invention.

FIG. 3 is a flowchart illustrating a control method of an MDPS system in accordance with an embodiment of the present invention.

As illustrated in FIG. 3, the control method of the MDPS system in accordance with the embodiment of the present invention may start with step S10 in which the MDPS controller 100 determines whether the vehicle speed is equal to or more than a preset vehicle speed.

At this time, the preset vehicle speed may be set according to by which speed the yaw rate value is stably estimated through the extended Kalman filter. In the present embodiment, the preset vehicle speed may be set to 20 kph, but changed to various values.

When it is determined at step S10 that the vehicle speed is less than the preset vehicle speed, the MDPS controller 100 may output the final assist torque by calculating a motor position control value such that a motor angle follows a steering angle, because the yaw rate sensor 10 or the lateral acceleration sensor 20 outputs no signal.

First, the MDPS controller 100 may synchronize the steering angle of the steering angle sensor 40 with the motor angle of the motor angle sensor 50 when the vehicle is started, at step S80.

Since the steering angle sensor 40 is an absolute angle sensor, the steering angle sensor 40 can output a steering angle depending on the position of the steering wheel, when the vehicle is started. However, since the motor angle sensor 50 cannot know the absolute position, the motor angle sensor 50 may recognize and store the absolute angle of the steering angle sensor 40 during the start of the vehicle as the current position of the motor angle sensor 50, and then synchronize the steering angle and the motor angle in consideration of a gear ratio. Therefore, the motor angle sensor 50 may provide the motor angle by updating a changed position through an encoder based on the synchronized current position.

Based on the steering angle and the motor angle which are inputted after the steering angle sensor 40 and the motor angle sensor 50 are synchronized, the MDPS controller 100 may calculate the motor position control value such that the motor angle follows the steering angle, at step S90.

Then, the MDPS controller 100 may output the motor position control value calculated at step S90 as the final assist torque to the driving motor (not illustrated) at step S100. Therefore, the assist torque required for the driver may be generated in the steering direction of the driver.

On the other hand, when it is determined at step S10 that the vehicle speed is equal to or more than the preset vehicle speed, the MDPS controller 100 may receive the yaw rate value, the lateral acceleration and the vehicle speed from the yaw rate sensor 10, the lateral acceleration sensor 20 and the vehicle speed sensor 30, and estimate a behavior value based on the dynamic model of the vehicle, at step S20.

The behavior value may include one or more of a side slip, steering angle and estimated yaw rate value.

When the MDPS controller 100 receives the vehicle speed, the yaw rate value and the lateral acceleration and estimates a side slip and steering angle of the vehicle based on the dynamic model of the vehicle, the extended Kalman filter may be used to prevent a sense of difference or vibration which is caused by noise generated from the yaw rate sensor 10 or the lateral acceleration sensor 20.

After estimating the behavior value at step S20, the MDPS controller 100 may calculate front and rear tire lateral forces based on the estimated behavior value, at step S30.

When the vehicle travels at low speed while the front and rear tire lateral forces are calculated, the yaw rate sensor 10 or the lateral acceleration sensor 20 may output no signal or output an unstable signal, due to the behavior characteristic of the vehicle. Therefore, the MDPS controller 100 may use the yaw rate value estimated through the extended Kalman filter.

After calculating the front and rear tire lateral forces at step S30, the MDPS controller 100 may calculate a rack force by multiplying the calculated front and rear tire lateral forces by a cornering stiffness correction gain.

At this time, the calculated front and rear tire lateral forces may be very similar to the pattern of assist torque required when the driver steers the vehicle. However, since a change of the yaw rate value depending on the vehicle behavior does not completely coincide with an actual column torque change of the driver, the MDPS controller 100 may calculate the rack force by multiplying the cornering stiffness correction gain by the front and rear tire lateral forces, in order to match the yaw rate value with the column torque pattern required for the driver depending on the vehicle behavior.

After calculating the rack force at step S40, the MDPS controller 100 may calculate column torque by inversely transforming the calculated rack force, at step S50.

After calculating the column torque at step S50, the MDPS controller 100 may calculate assist torque based on the calculated column torque, the vehicle speed and the steering angle, at step S60.

Then, the MDPS controller 100 may output the calculated assist torque as the final assist torque to the driving motor, thereby generating assist torque required for the driver, at step S70.

As described above, the control method of the MDPS system in accordance with the embodiment of the present invention can generate assist torque required for a driver by estimating virtual column torque based on the yaw rate, the lateral acceleration and the vehicle speed, even though the torque sensor breaks down, thereby maximizing stability and reliability. Furthermore, the control method of the MDPS system can generate the assist torque by estimating the column torque without a torque sensor, which makes it possible to reduce the number of parts and the manufacturing cost.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An MDPS (Motor Driven Power Steering) system comprising:
    a vehicle speed sensor configured to sense a vehicle speed of a vehicle;
    a yaw rate sensor configured to sense a tilted state of the vehicle, and output a yaw rate value;
    a lateral acceleration sensor configured to sense a lateral acceleration which acts in a lateral direction of the vehicle; and
    an MDPS controller configured to:
        receive the vehicle speed from the vehicle speed sensor;
        receive the yaw rate value from the yaw rate sensor;
        receive the lateral acceleration from the lateral acceleration sensor;
        determine an estimated column torque without using a torque sensor, based on the vehicle speed, the yaw rate value, and the lateral acceleration;
        determine an assist torque based on the vehicle speed, a steering angle of the vehicle, and the estimated column torque; and
        output, based on the vehicle speed being greater than or equal to a preset vehicle speed, the assist torque to be used to assist steering of the vehicle,
    wherein the MDPS controller is further configured to:
        determine a behavior value, by estimating the behavior value through an external Kalman filter based on a dynamic model of the vehicle, the behavior value comprising one or more of a side slip of the vehicle, the steering angle, and an estimated yaw rate value; and
        calculate the estimated column torque based on the behavior value, and
    wherein the preset vehicle speed is set according to a speed at which the estimated yaw rate value may be estimated through the Kalman filter.

2. The MDPS system of claim 1, wherein the MDPS controller is further configured to:
    calculate front and rear tire lateral forces based on the behavior value;
    calculate a rack force by multiplying the front and rear tire lateral forces by a cornering stiffness correction gain; and
    calculate the estimated column torque by inversely transforming the rack force.

3. The MDPS system of claim 2, wherein the MDPS controller is further configured to:
    receive the steering angle from a steering angle sensor of the vehicle;
    receive a motor angle from a motor angle sensor of the vehicle;
    calculate a motor position control value such that the motor angle follows the steering angle; and
    output, based on the vehicle speed being less than the preset vehicle speed, the motor position control value to be used to assist steering of the vehicle.

4. The MDPS system of claim 3, wherein the MDPS controller is further configured to store an absolute position of the steering angle during a start of the vehicle as a current position of the motor angle sensor.

5. A method of controlling an MDPS (Motor Driven Power Steering) system of a vehicle, comprising:
    receiving, by an MDPS controller of the vehicle, vehicle speed, a yaw rate value, and a lateral acceleration;
    determining, by the MDPS controller, an estimated column torque without using a torque sensor, based on the vehicle speed, the yaw rate value, and the lateral acceleration;
    determining, by the MDPS controller, an assist torque based on the vehicle speed, a steering angle of the vehicle, and the estimated column torque; and
    outputting, by the MDPS controller and based on the vehicle speed being greater than or equal to a preset vehicle speed, the assist torque to be used to assist steering of the vehicle, wherein the determining of the estimated column torque comprises:
estimating a behavior value through an external Kalman filter based on a dynamic model of the vehicle, the behavior value comprising one or more of a side slip of the vehicle, the steering angle, and an estimated yaw rate value; and
calculate the estimated column torque based on the behavior value, and
wherein the preset vehicle speed is set according to a speed at which the estimated yaw rate value may be estimated through the Kalman filter.

6. The method of claim 5, further comprising:
receiving, by the MDPS controller, the steering angle and a motor angle of the vehicle;
calculating, by the MDPS controller, a motor position control value through PID control such that the motor angle follows the steering angle; and
outputting, by the MDPS controller and based on the vehicle speed being less than the preset vehicle speed, the motor position control value to be used to assist steering of the vehicle.

7. The method of claim 5, further comprising storing an absolute position of the steering angle during a start of the vehicle as a current position of a motor angle sensor.

* * * * *